United States Patent [19]
An

[11] Patent Number: 5,904,047
[45] Date of Patent: May 18, 1999

[54] AIR CONDITIONER CONTROL APPARATUS AND METHOD THEREFOR

[75] Inventor: Sang-Man An, Kyungki-do, Rep. of Korea

[73] Assignee: Samsung Electronics Co., Ltd., Kyungki-Do, Rep. of Korea

[21] Appl. No.: 08/933,335

[22] Filed: Sep. 18, 1997

[30] Foreign Application Priority Data

Oct. 26, 1996 [KR] Rep. of Korea ................... 96-48742

[51] Int. Cl.⁶ ............................................. F25B 41/00
[52] U.S. Cl. ............................ 62/81; 62/156; 62/175; 62/227
[58] Field of Search ......................... 62/156, 175, 180, 62/227, 80, 81

[56] References Cited

U.S. PATENT DOCUMENTS

| | | | |
|---|---|---|---|
| 4,876,859 | 10/1989 | Kitamoto | 62/175 X |
| 5,056,325 | 10/1991 | Josten et al. | 62/180 X |
| 5,263,333 | 11/1993 | Kubo et al. | 62/175 X |
| 5,743,101 | 4/1998 | Shida et al. | 62/175 |

*Primary Examiner*—Henry A. Bennett
*Assistant Examiner*—Susanne C. Tinker
*Attorney, Agent, or Firm*—Burns, Doane, Swecker & Mathis, L.L.P.

[57] ABSTRACT

This invention provides an air conditioner for simultaneously cooling or heating a plurality of rooms by using a single outdoor unit and at least two and more indoor units connected to the outdoor unit, the air conditioner including indoor heat exchangers installed in each room, for heat-exchanging a room air, a unit for detecting varying temperatures of conduit during the air conditioning, a control unit for controlling low temperature, high temperature, and defrosting operations for respective indoor units on the basis of the detected conduit temperature, and for coding operation states of respective indoors to input/output the coded communication signals, a communicating unit for transmitting and receiving the coded communication signals through input/output ports provided with the control unit for communicating between any indoor units.

10 Claims, 11 Drawing Sheets

→ COOLING
--→ HEATING

FIG. 5

| DEFROSTING OPERATION | | | | | | |
|---|---|---|---|---|---|---|
| | INDOOR UNIT CONDITION | | RESULT | OUTDOOR FAN | COMPRESSOR | |
| | ROOM A | ROOM B | | | ROOM A | ROOM B |
| | HEATING OPERATION | HEATING OPERATION | HEATING OPERATION | NORMAL OPERATION | NORMAL | NORMAL |
| 1 | DEFROSTING OPERATION | HEATING OPERATION | DEFORSTING OPERATION FOR BOTH OF ROOMS A, B | OFF | DEFROSTING OPERATION | DEFROSTING OPERATION |
| | HEATING OPERATION | DEFROSTING OPERATION | DEFROSTING OPERATION FOR BOTH OF ROOMS A, B | OFF | DEFROSTING OPERATION | DEFROSTING OPERATION |

FIG. 6

LOW TEMPERATURE OPERATION

| | INDOOR UNIT CONDITION | | RESULT | OUTDOOR FAN | COMPRESSOR | |
|---|---|---|---|---|---|---|
| | ROOM A | ROOM B | | | ROOM A | ROOM B |
| 1 | COOLING OPERATION | COOLING OPERATION | COOLING OPERATION | NORMAL OPERATION | NORMAL OPERATION | NORMAL OPERATION |
| | COOLING OPERATION | LOW TEMPERATURE (FIRST) OPERATION | ROOM B DETECT LOW TEMPERATURE (FIRST) | OFF | NORMAL OPERATION | NORMAL OPERATION |
| | LOW TEMPERATURE (FIRST) OPERATION | COOLING OPERATION | ROOM A DETECT LOW TEMPERATURE (FIRST) | OFF | NORMAL OPERATION | NORMAL OPERATION |
| 2 | COOLING OPERATION | LOW TEMPERATURE (SECOND) OPERATION | ROOM B DETECT LOW TEMPERATURE (SECOND) | ON | NORMAL OPERATION | OFF |
| | LOW TEMPERATURE (SECOND) OPERATION | COOLING OPERATION | ROOM A DETECT LOW TEMPERATURE (SECOND) | ON | OFF | NORMAL OPERATION |

FIG. 7

HIGH TEMPERATURE OPERATION

| | INDOOR UNIT CONDITION | | RESULT | OUTDOOR FAN | COMPRESSOR | |
|---|---|---|---|---|---|---|
| | ROOM A | ROOM B | | | ROOM A | ROOM B |
| 1 | HEATING OPERATION | HEATING OPERATION | HEATING OPERATION | NORMAL OPERATION | NORMAL OPERATION | NORMAL OPERATION |
| | HEATING OPERATION | HIGH TEMPERATURE (FIRST) OPERATION | ROOM B DETECT HIGH TEMPERATURE (FIRST) | OFF | NORMAL OPERATION | NORMAL OPERATION |
| | HIGH TEMPERATURE (FIRST) OPERATION | HEATING OPERATION | ROOM A DETECT HIGH TEMPERATURE (SECOND) | OFF | NORMAL OPERATION | NORMAL OPERATION |
| 2 | HEATING OPERATION | HIGH TEMPERATURE (SECOND) OPERATION | ROOM B DETECT HIGH TEMPERATURE (SECOND) | ON | NORMAL OPERATION | OFF |
| | HIGH TEMPERATURE (SECOND) OPERATION | HEATING OPERATION | ROOM A DETECT HIGH TEMPERATURE (SECOND) | ON | OFF | NORMAL OPERATION |

AIR CONDITIONER CONTROL APPARATUS AND METHOD THEREFOR

BACKGROUND OF THE INVENTION

1. Field of the Invention

The invention relates to a heat pump type of multi-air conditioner (hereinafter, referred to as an air conditioner) suitable for simultaneously heating and cooling a plurality of rooms by using a single outdoor unit and two and more indoor units connected to the outdoor unit, and more particularly to an air conditioner control apparatus and method thereof which recognizes operation states of indoor units with communication between indoors units, and performs a normal operation of one indoor unit, even if the other indoor unit is under a safety operation mode (i.e., a defrosting operation, a high temperature operation, or a low temperature operation).

2. Description of the Prior Art

In general, there are provided two types of an air conditioner, i.e., one being a heating apparatus for heating cold air in a room and the other being a cooling apparatus for cooling warm air in the room.

There is also an apparatus having dual functions of heating and cooling the room, and in addition an air-cleaning function for cleaning polluted indoor air.

Referring to FIG. 1, there is illustrated a conventional air conditioner of a cooling-only apparatus.

As shown in FIG. 1, when refrigerant compressed by a compressor 1 to gaseous state at high temperature and high pressure is infused to an outdoor heat exchanger 2, the outdoor heat exchanger 2 serves to heat-exchange the same with air blown by an outdoor fan (not shown), and forcibly cool the refrigerant to allow the same to be liquefied.

The fluid refrigerant of low temperature and high pressure liquefied at the outdoor heat exchanger 2 passes through an expansion valve 3 for expanding the refrigerant to an evaporating pressure, reduced in pressure to become atomized refrigerant of low pressure and low temperature and is infused to an indoor heat exchanger 4.

Accordingly, the atomized refrigerant reduced to low pressure and low temperature at the expansion valve 3 is evaporated in the course of passing through various pipes and takes heat from the air blown by an indoor fan 9 in the course of being gasified, to thereby cool the air in a room.

The cooled air (blown) is in turn discharged indoors to thereby perform a cooling operation. The gaseous refrigerant of low pressure and low temperature cooled at the indoor heat exchanger 4 is in turn fed to the compressor 1 and circulated repeatedly through a cooling loop as illustrated by continuous solid line arrows in FIG. 1.

However, there is a problem in the conventional air conditioner for performing the cooling operation according to the cooling cycle thus described, in that various rooms cannot be simultaneously cooled because of the individual cooling operation performed by one outdoor unit for controlling one indoor unit, and an indoor heating cannot be performed.

By way of another prior art of utilizing an invert air conditioner for performing dual operations of cooling and heating the room (see FIG. 2), when refrigerant compressed in gaseous state of high temperature and high pressure at the compressor is infused into the outdoor heat exchanger 2 according to control of a four-way valve 5, as shown in FIG. 2, the outdoor-heat exchanger 2 serves to forcibly cool the gaseous refrigerant compressed in high temperature and high pressure by way of the air blown by the outdoor fan, thereby liquefying the same.

The fluid refrigerant of low temperature and high pressure liquefied by the outdoor heat exchanger 2 passes through the expansion valve 3 for expanding the same to evaporative pressure via an one way valve 7 to thereby be reduced to atomized refrigerant of low pressure and low temperature and to be infused into the indoor heat exchanger 4.

Accordingly, the atomized refrigerant in the indoor heat exchanger 4 reduced to low temperature and low pressure at the expansion valve 3 takes the heat from the air blown by the indoor fan 9 to thereby cool the air in the room when the atomized refrigerant passes through various pipes and is evaporized and is finally gasified. The cooled air (blown) is in turn discharged indoors to thereby perform a cooling operation. The gasified refrigerant of low pressure and low temperature cooled by the indoor heat exchanger 4 is in turn fed into the compressor 1 and circulates repeatedly through a cooling loop as illustrated by solid line arrows in FIG. 2, thereby performing the indoor cooling operation.

Meanwhile, in case of heating, when the refrigerant compressed to gaseous state of high pressure and high temperature by the compressor 1 is infused into the indoor heat exchanger 4 according to the control of the four-way valve 5, the indoor heat exchanger 4 serves to heat-exchange the air blown by the indoor fan 9, to thereby cool the refrigerant to room temperature and high pressure. Thus, the heated air is discharged to perform the heating operation.

The refrigerant liquefied by the indoor heat exchanger 4 is reduced to refrigerant of low temperature and low pressure by the expansion valve 3 and an expansion valve 6 and is then infused into the outdoor heat exchanger 2.

Accordingly, the outdoor heat exchanger 2 serves to heat-exchange the refrigerant reduced in pressure at the expansion valve 3 and the expansion valve 6 by way of the air blown by the outdoor fan 8, thereby cooling the refrigerant.

The gasified refrigerant of low temperature and low pressure cooled by the outdoor heat exchanger 2 is in turn fed into the compressor 1 and circulated repeatedly through a heating loop as illustrated by dotted line arrows in FIG. 2, thereby performing an indoor heating operation.

However, there is a problem in the air conditioner depicted in FIG. 2 in that heating cannot be performed during the cooling operation and cooling cannot be performed during the heating operation, thereby making it impossible to cater to various demands by consumers and to simultaneously perform the heating and the cooling operations, although there is an advantageous point in that the heating and the cooling can be executed by one outdoor unit controlling one indoor unit.

To overcome those problems, the present applicant has proposed another type of an air conditioner capable of simultaneously cooling and heating various room spaces by using two and more indoor units connected to a single outdoor unit, this unit having two compressors and two four-way valves. However, one indoor unit cannot know the operation states of the other indoor units due to the absence of communications between various indoor units. In case the safety operation mode (defrosting, high or temperature operations of the air conditioner) in one indoor unit is performed, the operation of other indoor unit has to be forcibly stopped, in order to perform an air conditioner control.

SUMMARY OF THE INVENTION

Therefore, the present invention is disclosed to solve the aforementioned problems and it is an object of the present invention to provide a control apparatus of an air conditioner and a method thereof, the apparatus having communication capabilities between various indoor units, whereby one indoor unit checks, as desired, operation states of the other indoor units, so that one indoor unit can be normally operated even if the other indoor unit is being operated under the safety operation mode, thereby meeting consumer satisfaction for the product.

According to the object of the present invention, there is provided an air conditioner for simultaneously cooling or heating a plurality of rooms by using a single outdoor unit and at least two and more indoor units connected to the outdoor unit, the air conditioner comprising: indoor heat exchangers installed in each room, for heat-exchanging a room air; means for detecting varying temperatures of conduit during the air conditioning; control means for controlling low temperature, high temperature, and defrosting operations for respective indoor units on the basis of the detected conduit temperature, and for coding operation states of respective indoors to input/output the coded communication signals; communicating means for transmitting and receiving the coded communication signals through input/output ports provided with the control means for communicating between any indoor units; means for driving a compressor so as to control the low and high temperature operations in response to the control means; and means for driving an outdoor fan motor so as to control the low and high temperature operations and defrosting operation in response to the control means.

Also, according to the present invention, there is provided a method for controlling an air conditioner operation, the method comprising the steps of: determining whether a current operation is two rooms operation or not; performing simultaneous cooling and heating operations, based upon the operation conditions determined by the decision step; determining whether a safety operation mode for the air conditioner is applied or not, the safety operation mode corresponding to a low temperature operation, a high temperature operation and a defrosting operation in response to a conduit temperature of an indoor heat exchanger, wherein the conduit temperature varies during the air-conditioning operations; and driving a compressor and outdoor fan, based upon the determined one of the safety operation modes.

BRIEF DESCRIPTION OF THE DRAWINGS

Other objects and aspects of the invention will become apparent from the following description of embodiments with reference to the accompanying drawings in which:

FIG. 5 is a table explaining compressor and outdoor fan operations during a defrosting operation according to one embodiment of the present invention;

FIG. 6 is a table explaining compressor and outdoor fan operations during a low temperature operation according to one embodiment of the present invention; and FIG. 7 is a table explaining compressor and outdoor fan operations during a high temperature operation according to one embodiment of the present invention.

DETAILED DESCRIPTION OF THE PREFERRED EMBODIMENT

The embodiments of the present invention will now be described in detail with reference to the accompanying drawings.

Figure 3:
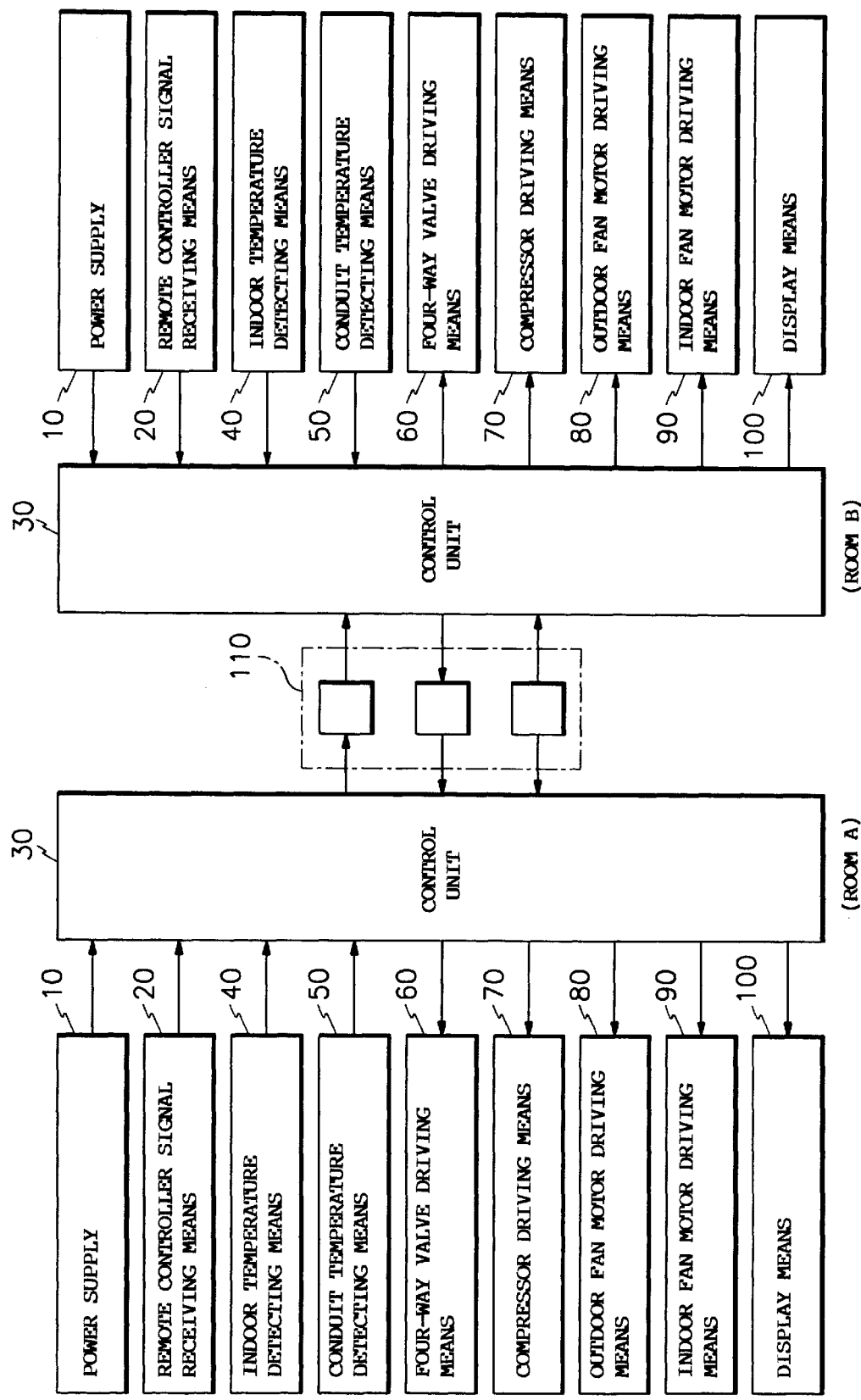
FIG. 3 is a control block diagram for illustrating a control apparatus of an air conditioner according to the present invention.
Figure 4A:
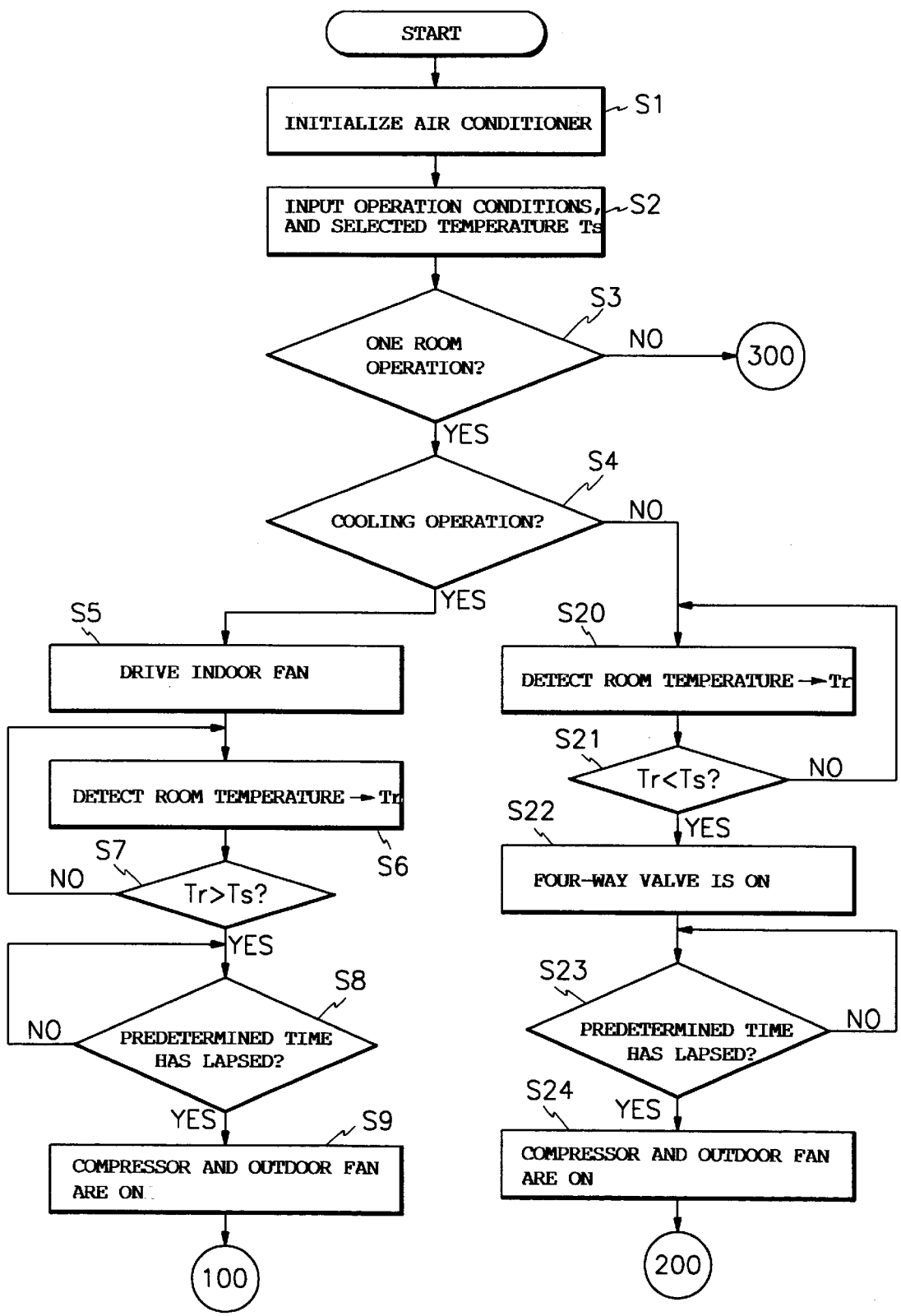
FIGS. 4A to 4D are flow charts for illustrating an operational procedure of the air conditioner according to the present invention.
Figure 4B:
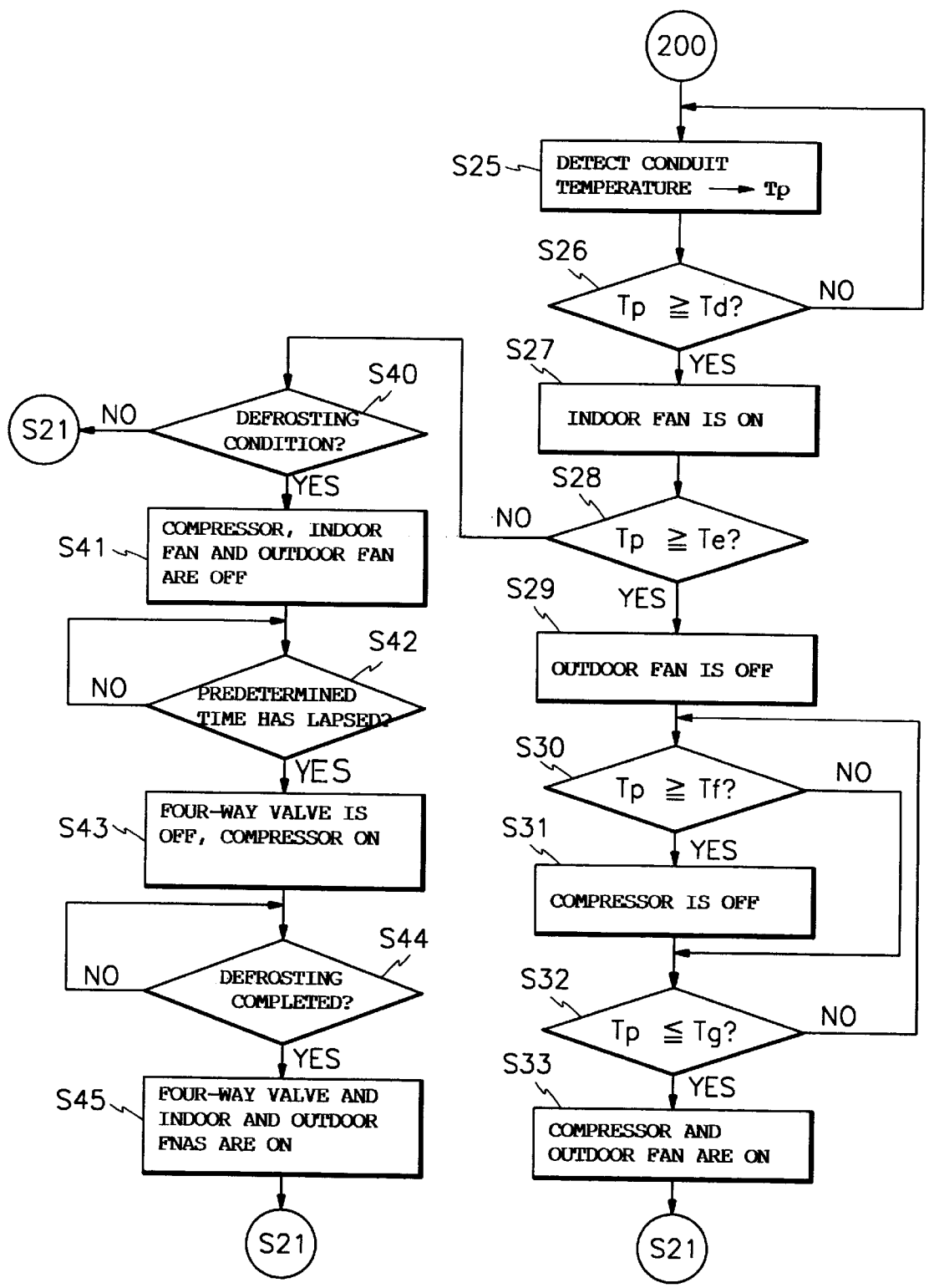
Figure 4C:
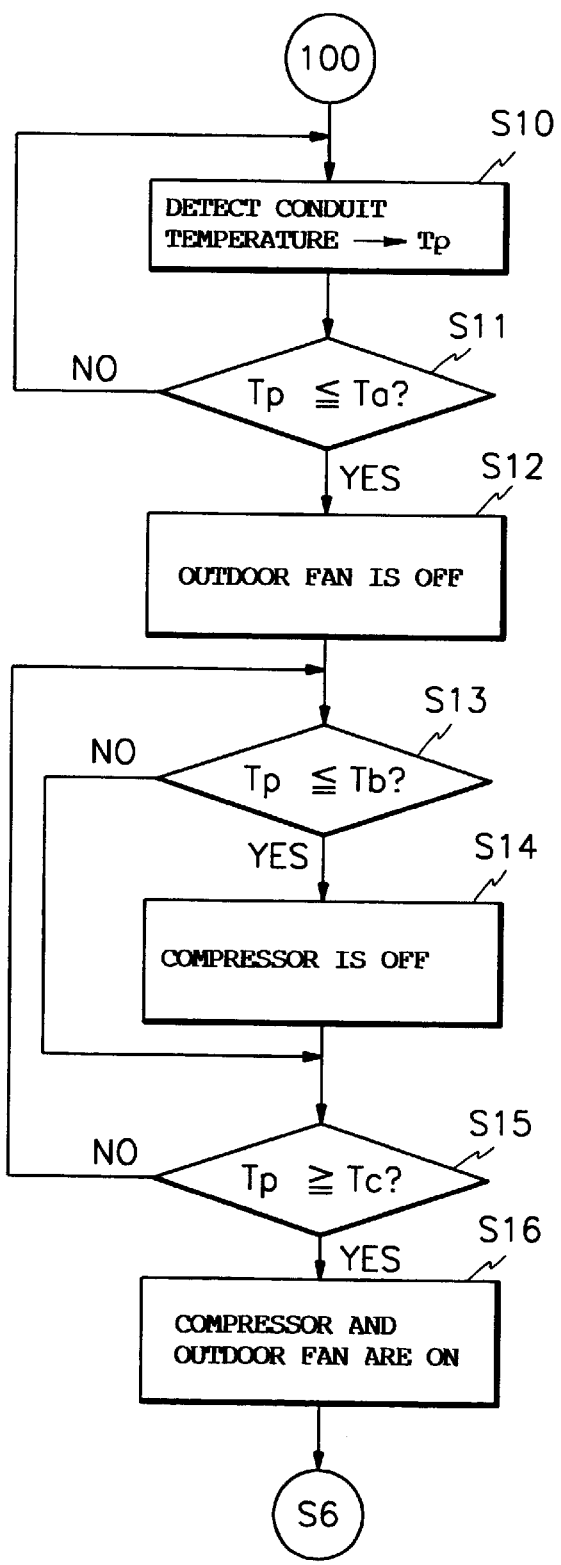
Figure 4D:
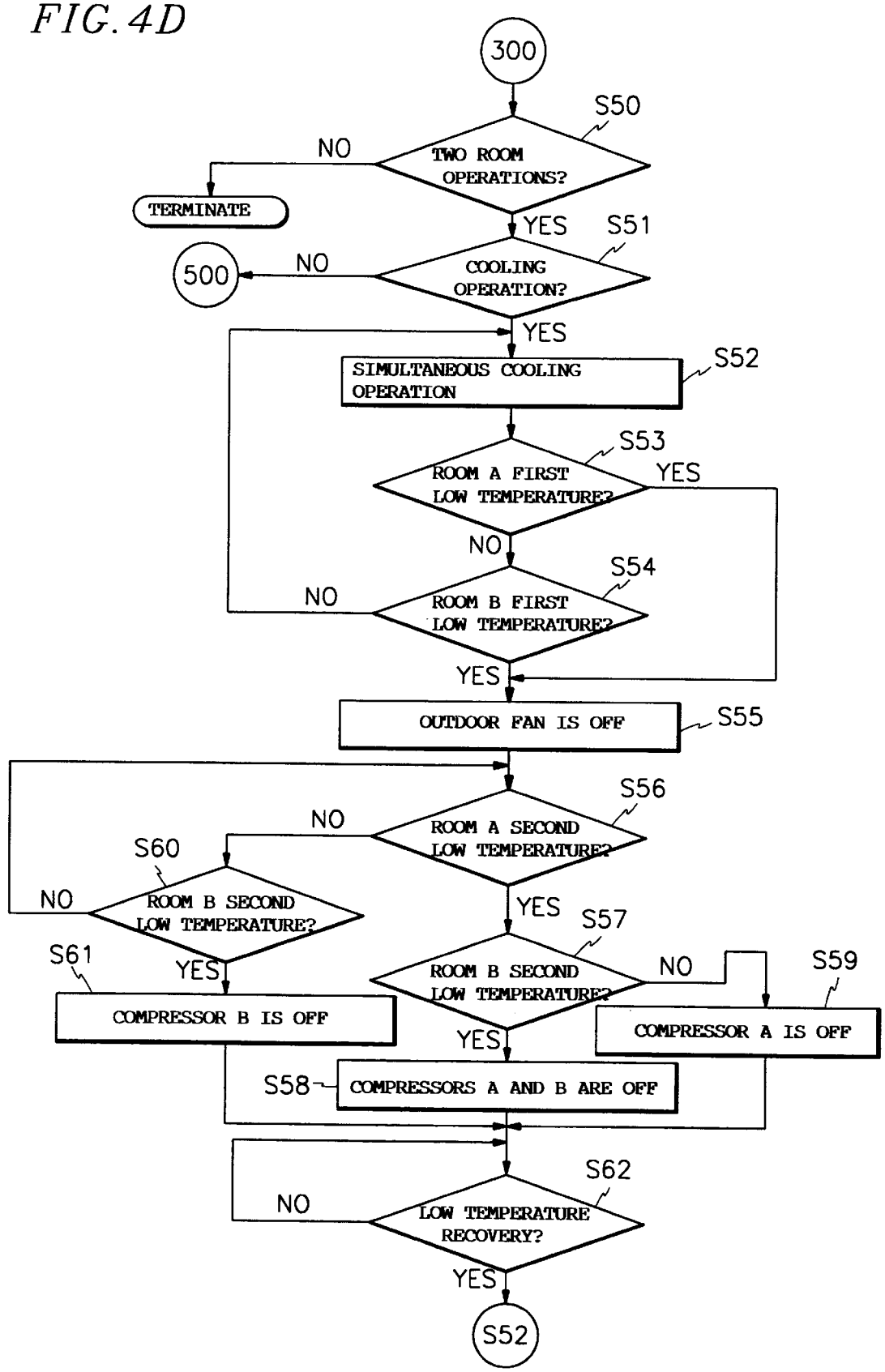
Figure 4E:
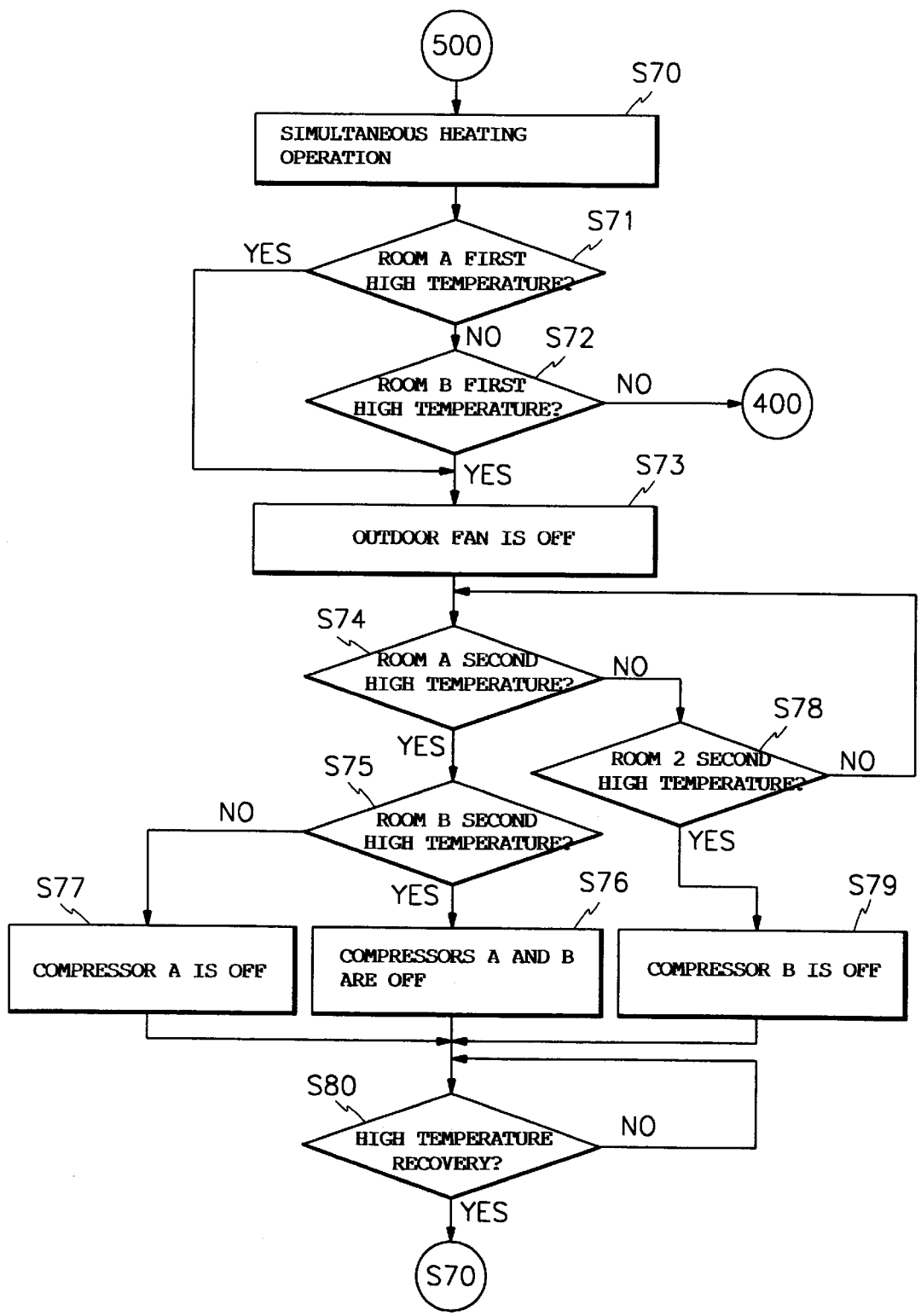
Figure 4F:
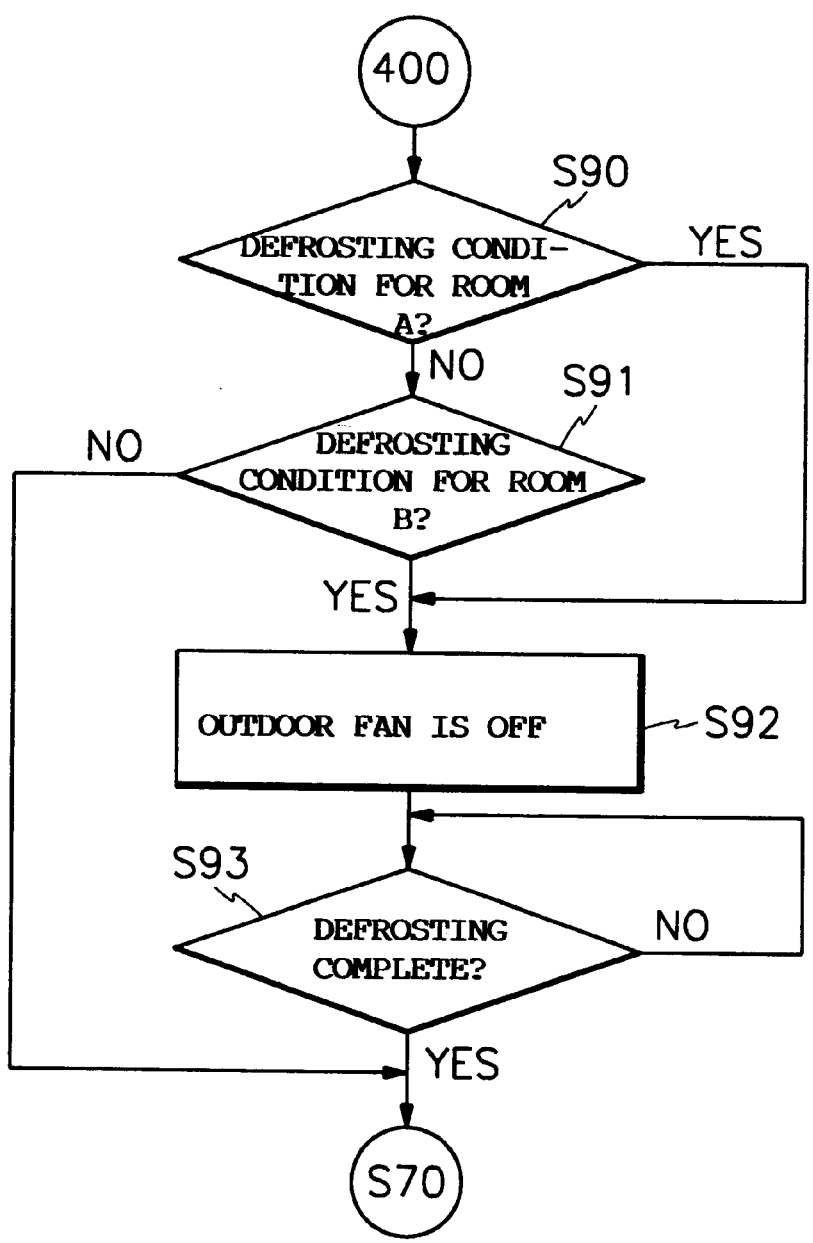

Referring to FIG. 3, a DC electric power source means 10 serves to receive electrical source voltage of commercial AC electric power source supplied from an AC power source stage to convert it to a predetermined DC voltage necessary for operations (the driving of load and microcomputer, communication, etc.) of an air conditioner and output the same.

Means 20 for receiving signals from a remote controller intends to receive infrared signals transmitted from the remote controller, the signals carrying commands of the air conditioner operational modes (cooling, heating, automatic cooling and heating), a preset temperature, and flow rate and direction of a discharged air selected through use of manual operation selecting keys of the remote controller.

Each of two control means 30 comprises a microcomputer included in each indoor unit, which serves to receive the DC voltage output from the DC power source means 10 to initialize the air conditioner and to control overall operations of the air conditioner according to the operating condition received by the means 20. The control means 30 determines, based upon respective room temperatures in the respective indoor units, the operation of the compressor 1, controls the operation of a safety operation mode (i.e., defrosting, high temperature operation, or low temperature operation) on the basis of a conduit temperature of the indoor heat exchanger 4, and receive and outputs communication signals coded for the operation states of respective indoor units through I/O (input/output) ports thereof.

To control the room temperature to thereby cause the same to become the temperature Ts established by the user by way of the means 20, so that the air conditioner can be operated, indoor temperature detecting means 40 is used to detect a temperature Tr of room air and outputs it to the control means 30.

Conduit temperature detecting means 50 is used to detect a temperature of conduit in the indoor heat exchanger 4, the temperature being varied during the operation of the air conditioner, or a temperature of the refrigerant passing through the indoor heat exchanger 4, and outputs it to the control means 30.

Four-way valve driving means 60 serves to receive a control signal of the control means 30 in order to cause the refrigerant to change the passage in which the refrigerant circulates, according to the operating conditions (heating or cooling) received by the means 20, and to drive four-way valve 5 to be opened and closed.

Compressor driving means 70 serves to receive the control signal output from the control means 30 according to a difference between a temperature Ts established by the user by way of the means 20 and the room temperature Tr detected by the indoor temperature detecting means 40 to thereby controllably drive a compressor 1.

Outdoor fan motor driving means 80 serves to receive the control signal of the control means 30 according to the difference between a temperature Ts established by the user by way of the means 20 and the room temperature Tr detected by the indoor temperature detecting means 40 and control the operation of the outdoor fan 8 to blow outside the air heat-exchanged by an outdoor heat exchanger 2.

Indoor fan motor driving means 90 serves to receive the control signal output from the control means 30 according to air flow rate selected by the user by way of the means 20 to control speed of an indoor fan 9 so that the air (hot air or cool air) heat-exchanged by an indoor heat exchanger 4 can be blown into the room.

Display means 100 serves to display the operating conditions and preset temperature Ts established by the user by way of the means 20 according the control of the control means 30 and at the same time, serves to display an operation state of the air conditioner as well.

Communicating means 110 comprises a communication cable connected between two indoor units to input and output communication signals coded for the operating conditions (cooling, heating, automatic cooling and heating) and safety operation modes (defrost, high temperature and low temperature operations) for the respective indoor units to and from indoor units, the means 110 apparently including separate circuits for receiving/transmitting the communication signals.

The operation and advantages of the control apparatus of the air conditioner and method thereof will be described below.

FIGS. 4A to 4D are flow charts for explaining sequential operation control procedures of the air conditioner.

When electric power is supplied to the air conditioner, DC electric power source means 10 serves to convert commercial AC power to a predetermined DC voltage necessary for driving the air conditioner, thereby supplying the same to respective driving circuits and control means 30.

At step S1, the DC voltage output from the DC electric power source means 10 is received by the control means 30 to thereby initialize the air conditioner.

At step S2, the operating modes (cooling, heating, automatic cooling and heating, etc.), the selected temperature Ts, flow rate and direction of a discharged air wanted by the user are input to the remote controller which encodes the input commands by using a predetermined encoding protocol, and then modulates the encoded signals into the infrared light signals suitable for transmitting them. If the infrared light signals are transmitted from the remote controller, the means 20 receives them, converts the received signals into the electric signals, and then demodulates the converted signals. The demodulated signals are input to the control means 104.

At this time, the display means 100 serves to display the operating conditions, selected temperature Ts and the like input by the means 20 according to the control of the control means 30.

Successively, at step S3, the control means 30 determines whether the operation condition input by the means 20 is one room operation (for example, an operation for room A). In case of YES, flow goes to step S4 where it is determined whether the condition is a cooling operation.

If it is determined that the condition is the cooling operation (in case of YES), flow goes to step S5 in which the control means 30 outputs a control signal to the indoor fan motor driving means 90 to drive the indoor fan 9.

The driven indoor fan 9 sucks room air into the indoor unit through the suction inlet (not shown). At step S6, the indoor temperature detecting means 40 senses the temperature Tr of the sucked air and outputs it to the control means 30.

Next, step S7 makes a decision as to whether the sensed temperature Tr is higher than the preset temperature Ts. If not (in case of NO), the room is not required to be cooled. The room temperature Tr is continuously detected and the steps subsequent to step S6 are repeated.

However, if the indoor temperature Tr is higher than the preset temperature Ts (in case of YES), this implies that the room has to be cooled. Then, flow goes to step S8, in which it is determined whether a predetermined time period (i.e., a delay time, approximately 3 minutes, necessary for protecting the compressor) after the indoor fan 9 is driven has lapsed or not, and if not (in case of NO), steps subsequent to step 8 are repeated until the predetermined time period lapses.

In case the predetermined time period has lapsed (in case of YES), which means that there is no problem to the compressor 1 even it is driven because the consumed current is constant, the control means 30, at step S9, determines an operational frequency of the compressor 1 according to the difference between the room temperature Tr and the selected temperature Ts and outputs a control signal for driving the compressor 1 to compressor driving means 70. Further, the control means 30 determines the revolution number of outdoor fan motor based upon the difference between the room temperature Tr and the selected temperature Ts and outputs a control signal for driving the outdoor fan 8 to outdoor fan motor driving means 80.

Accordingly, the compressor driving means 70 serves to drive the compressor 1 according to the operational frequency determined by the control means 30, and the outdoor fan motor driving means 80 drives the outdoor fan 8 according to the revolution number determined by the control means 30.

When the compressor 1 and outdoor fan 8 are driven, the refrigerant gas compressed to gaseous state of high temperature and high pressure is infused to the outdoor heat exchanger 2 through the four-way valve 5. The outdoor heat exchanger 2 serves to heat-exchange the gaseous refrigerant compressed to high temperature and high pressure with the air blown by the outdoor fan 8, to forcibly cool the refrigerant and to liquefy the same.

The fluid refrigerant of low temperature and high pressure liquefied by the outdoor heat exchanger 2 is reduced to atomized refrigerant of low temperature and low pressure through one-way valve 7 and through expansion valve 3 for expanding the same to evaporative pressure, and is infused to the indoor heat exchanger 4.

Accordingly, the indoor heat exchangers serve to take out the heat from the air blown by the indoor fan 9 when the atomized refrigerant reduced to low temperature and low pressure by the expansion valve 3 passes through a plurality of pipes to thereby be evaporized and gasified, and cool the room air and discharge the cooled air (blown) indoors and perform the cooling operation.

Figure 1:
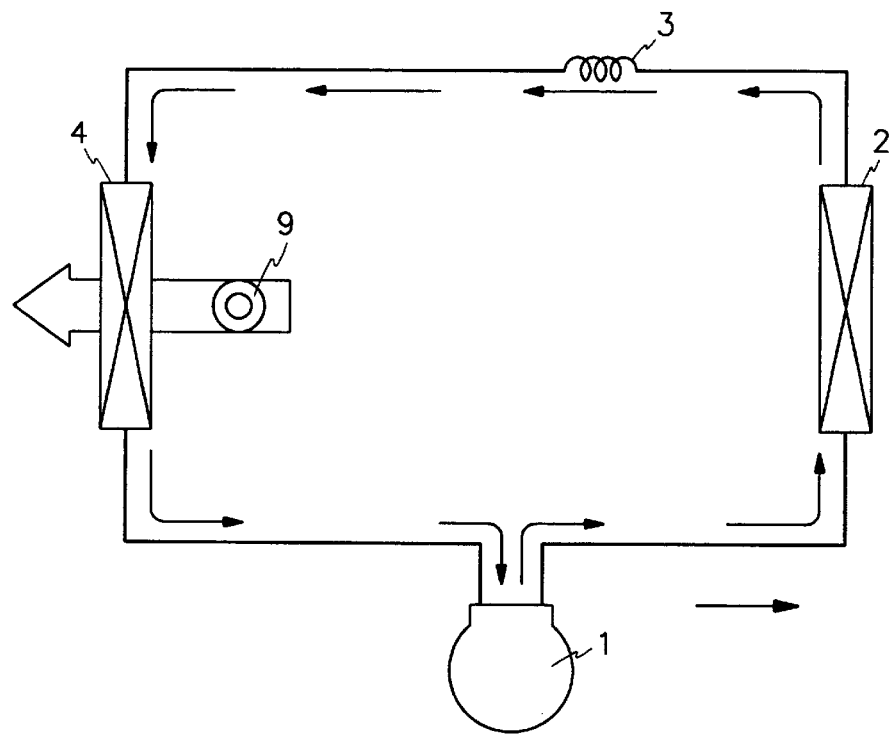
FIG. 1 is a schematic diagram for illustrating a cooling cycle of an air conditioner under cooling operation according to the prior art.
Figure 2:
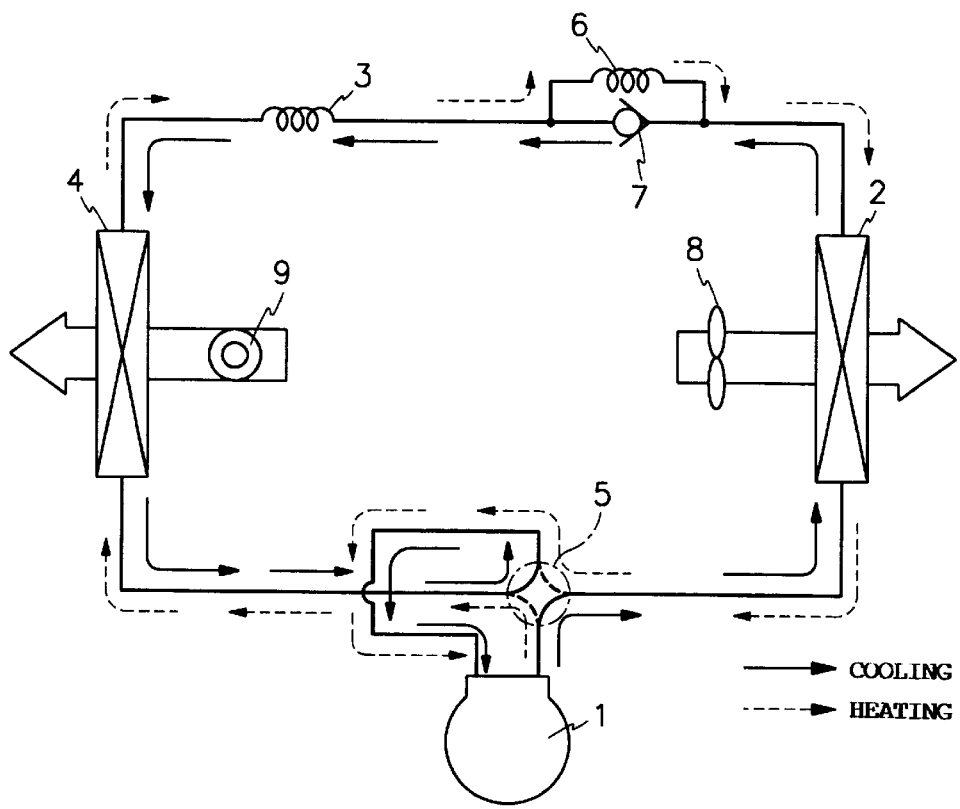
FIG. 2 is a schematic diagram for illustrating a cooling cycle of an air conditioner under cooling and heating operations according to the prior art.

At this time, the gaseous refrigerant of low pressure and low temperature cooled by the indoor heat exchanger 4 is infused again into the compressor 1 and is repeatedly circulated through a cooling cycle as illustrated by solid line arrow in FIG. 2.

As noted above, during a cooling operation for a constant time period, the conduit temperature of the indoor heat exchanger 4 becomes gradually lower by a cold air discharged when the heat exchanger 4 heat-exchanges the air blown by the indoor fan 9 with a cold air by the evaporation latent heat of the refrigerant.

To sense a low temperature operation of the indoor heat exchanger 4, at step S10, the conduit temperature detecting means 50 detects a temperature Tp of a conduit in the indoor heat exchanger 4, the temperature being varied during the operation of the air conditioner, or a temperature of the refrigerant passing through the indoor heat exchanger 4, and outputs it to the control means 30.

At step S11, it is determined whether or not the detected temperature Tp is lower than a first low temperature Ta (at which an indoor heat exchanger starts to fall to a low temperature, during a cooling operation) which is preset in the control means 30. If not (in case of NO), flow returns to step S10 for continuing to detect the conduit temperature Tp.

At step S11, if the temperature Tp is lower than the first low temperature Ta, step S12 is followed, where the control means 30 outputs a control signal to the outdoor fan motor driving means 80 to stop the outdoor fan 8.

Next, at step S13, it is determined whether or not the conduit temperature Tp is lower than a second low temperature Tb (at which an indoor heat exchanger fully reaches a low temperature, during a cooling operation) which is preset in the control means 30. If so (in case of YES), flow proceeds to step S14 where the control means 30 outputs a control signal to the compressor driving means 70 to stop the compressor 1.

Next, at step S15, it is determined whether the conduit temperature Tp is higher than a normal low recovery temperature Tc (at which the indoor heat exchanger returns to a normal low temperature) which is preset in the control means 30. If not (in case of NO), flow returns to step S13.

At step S15, in case the conduit temperature Tp is higher than the normal low recovery temperature Tc, the compressor driving means 70 drives the compressor 1 according to the operational frequency determined by the control means 30, the outdoor fan motor driving means 80 drives the outdoor fan 8 according to the revolution number determined by the control means 30, and then flow returns to step S6. However, at step S13, in case the conduit temperature Tp is not lower than the second low temperature Tb (in case of NO), flow goes to step S15.

Also, if step S4 decides that it is not a cooling operation (in case of NO), flow proceeds to step S20 in which in order to perform a heating operation, the indoor temperature detecting means 40 senses the temperature Tr of the room air and outputs it to the control means 30.

At step S21, it is determined whether the sensed temperature Tr is lower than the preset temperature Ts. If not (in case of NO), this means that the room air is not required to be warm. Therefore, flow returns to step S20 for continuing to detect the room temperature Tr.

At step S21, if the room temperature Tr is lower than the preset temperature Ts, the heating operation for the room has to be made. Therefore, at step S22, the control means 30 outputs a control signal to the four-way valve driving means 60 to open the four-way valve 5 which serves to cause the refrigerant to change the passage in which the refrigerant circulates as illustrated by solid line arrow in the drawing when the valve 5 is off, and by dotted line arrow when the valve 5 is on.

Then, flow goes to step S23, in which it is determined whether a predetermined time period (i.e., a delay time necessary for protecting the compressor) has lapsed or not. In case the predetermined time period has not yet lapsed (in case of NO), steps subsequent to step S23 are repeated until the predetermined time lapses. After lapse of the predetermined time (in case of YES), which means that there is no problem to the compressor 1 even it is driven because the consumed current is constant, the control means 30, at step S24, determines an operational frequency of the compressor 1 according to the difference between the room temperature Tr and the selected temperature Ts and outputs a control signal for driving the compressor 1 to compressor driving means 70. Further, the control means 30 determines the revolution number of outdoor fan motor based upon the difference between the room temperature Tr and the selected temperature Ts and outputs a control signal for driving the outdoor fan 8 to outdoor fan motor driving means 80.

Accordingly, the compressor driving means 70 serves to drive the compressor 1 according to the operational frequency determined by the control means 20, and the outdoor fan motor driving means 80 drives the outdoor fan 8 according to the revolution number determined by the control means 30.

When the compressor 1 and outdoor fan 8 are driven, the conduit temperature in the indoor heat exchanger 4 gets increasingly higher. At this time, the varying temperature of the conduit is detected by the conduit temperature detecting means 50 operatively coupled to the control means 30. Then, at step S26, it is determined whether the detected temperature Tp is higher than a cold air supplying inhibition temperature Td (a conduit temperature at which the cold air is not discharged indoors, at the heating operation) which is preset in the control means 30. If not (in case of), flow returns to step S25 for continuing to sense the conduit temperature Tp.

At step S26, in case it is determined that the conduit temperature Tp is higher than the cold air supplying inhibition temperature Td (in case of YES), no cold air would be supplied to the room if the indoor fan 9 were driven. Therefore, going to step S27, the control means 30 outputs a control signal to the indoor fan motor driving means 90 to drive the indoor fan 9. The means 90 drives the indoor fan 9 in compliance with the selected air flow rate inputted through the means 20.

If the compressor 1, outdoor fan 8 and indoor fan 9 are driven, the refrigerant gas compressed to gaseous state of high temperature and high pressure is infused to the indoor heat exchanger 4 through the four-way valve 5. The indoor heat exchanger 4 serves to heat-exchange the gaseous refrigerant compressed to high temperature and high pressure with the air blown by the outdoor fan 9. When the refrigerant is cooled to become the refrigerant at high temperature and high pressure, the warm air is created, which is used for the heating of the room.

The fluid refrigerant of low temperature and high pressure liquefied by the indoor heat exchanger 4 is reduced to atomized refrigerant of low temperature and low pressure through expansion valve 3 for expanding the same to evaporative pressure and through another expansion valve 6 for heating, and is infused to the outdoor heat exchanger 2.

Accordingly, the outdoor heat exchanger 2 takes out the heat from the air blown by the outdoor fans 8, 81 to be cooled, when the atomized refrigerant reduced to low temperature and low pressure by the expansion valves 3, 6 is infused thereto. The gaseous refrigerant of low pressure and low temperature cooled by the indoor heat exchanger 2 is infused again into the compressor 1 and is repeatedly circulated through a cooling cycle as illustrated by dotted line arrow in FIG. 2.

As noted above, during a heating operation for a constant time period, the conduit temperature of the indoor heat exchanger 4 becomes gradually higher.

To sense the high temperature operation of the indoor heat exchanger 4, at step S28, it is determined whether or not the detected conduit temperature Tp is higher than a first high temperature Te (at which an indoor heat exchanger starts to go to a high temperature, during a heating operation) which is preset in the control means 30. If Tp is higher than Te (in case of YES), step S29 is followed, where the control means 30 outputs a control signal to the outdoor fan motor driving means 80 to stop the outdoor fan 8.

Next, at step S30, it is determined whether or not the conduit temperature Tp is higher than a second high temperature Tf (at which an indoor heat exchanger fully reaches a high temperature, during a heating operation) which is preset in the control means 30. If so (in case of YES), flow returns to step S31 where the control means 30 outputs a control signal to the compressor driving means 70 to stop the compressor 1.

Next, at step S32, it is determined whether the conduit temperature Tp is higher than a high recovery temperature Tg (at which the indoor heat exchanger returns to a normal temperature, during the heating operation) which is preset in the control means 30. If not (in case of NO), flow returns to step S30.

At step S32, in case the conduit temperature Tp is lower than the high recovery temperature Tg, flow goes to step S33, where the compressor driving means 70 drives the compressor 1 according to the operational frequency determined by the control means 30, the outdoor fan motor driving means 80 drives the outdoor fan 8 according to the revolution number determined by the control means 30, and then flow returns to step S21. However, at step S30, in case the conduit temperature Tp is lower than the second high temperature Tf (in case of NO), flow goes to step S32.

Also, if step S28 decides that the conduit temperature Tp is lower than the first high temperature Te (in case of NO), flow goes to step S40 in which the control means 30 decides as to whether the condition corresponds to the defrosting condition or not.

After a heating operation is performed for a constant time period, there may be found frost on the surface of the outdoor heat exchanger 2, due to a cold air discharged outdoors when the outdoor heat exchanger heat-exchanges the air blown by the outdoor fan 8 with a cold air by the evaporation latent heat of the refrigerant. The outdoor unit may be frozen due to a thick frozen frost resulting from a heavy deposit of frost on the surface of the outdoor heat exchanger 2. The defrost condition is determined on the basis of the conduit temperature of the indoor heat exchanger 4 detected when the outdoor unit is at the frozen state of the outdoor unit.

At step S40, if it is determined that the condition does not correspond to the defrosting condition (in case of NO), flow returns to step S21. However, in case of the defrosting condition (in case of YES), flow goes to step S41 where the control means 30 stops the compressor 1 and outdoor and indoor fans 8, 9.

Next, at step S42, it is determined whether or not a predetermined time period has lapsed after the stop of the compressor 1, outdoor fan 8 and indoor fan 9. In case the predetermined time period has not yet lapsed (in case of NO), steps subsequent to step S42 are repeated until the predetermined time lapses. After lapse of the predetermined time (in case of YES), flow goes to step S43 so as to perform a defrost operation of the air conditioner, in which the control means 30 outputs control signals, respectively, for controlling the four-way valve 5 to be off and for driving the compressor 1.

With the four-way valve 5 being off and the compressor 1 driven, the refrigerant flows through a cooling cycle which is formed by the compressor 1 →four-way valve 5→outdoor heat exchanger 2→one-way valve 7→expansion valve 3→indoor heat exchanger 4→four-way valve 5→compressor 1, and the refrigerant is circulated in order as mentioned above to thereby perform the defrost operation. This operation is performed until the defrost deposited at the outdoor heat exchanger 2 is fully removed, the determination of which is made at step S44. Upon the completion of defrost, flow goes to step S45 where the control means 30 drives the four-way valve 5, outdoor fan 8, and indoor fan 9 and then returns to step S21.

Meanwhile, at step S3, in case the operation condition is not one room operation, flow goes to step S50 where it is determined whether the operation condition is two room operations (for example, room A and room B). However, if the operation condition is not two room operations (in case of NO), the operation is terminated.

In case of YES at step S50, flow goes to step S51 where it is determined whether the condition is a cooling operation.

If it is determined that the condition is the cooling operation (in case of YES), flow goes to step S52 in which the control means 30 performs simultaneous cooling operations for two rooms, like the cooling operation for one room as described earlier.

Successively, at step S53, it is determined whether the conduit temperature of the indoor heat exchanger 4 for the room A is lower than a first low temperature Ta. In case a first low temperature operation for the room A is not detected (in case of NO), the process proceeds to step S54 where the conduit temperature of the indoor heat exchanger 4 for the room B is lower than the first low temperature Ta for the detecting of a first low temperature operation for the room B.

At step S54, if the first low temperature operation for the room B is not detected, flow returns to step S52. In case of the first low temperature operation (in case of YES), flow goes to step S55 where the control means 30 outputs a control signal to the outdoor fan motor driving means 80 to stop the outdoor fan 8.

At step S53, either in case of the first low temperature operation for the room A (in case of YES), or in case both rooms A and B are at the states of the first low temperature operations, flow also goes to step S55.

Next, at step S56, a second low temperature operation for the room A is detected based upon the result determined as to whether the conduit temperature of the indoor heat exchanger 4 for the room A is lower than the second low temperature Tb or not.

In case the second low temperature operation for the room A is detected at step S56, the detected result is coded into communication signal and then transmitted through communication output ports $O_A$, $O_B$ under the control of the control means 30 for the room A, such that the detection of a low temperature operation of the cooling operation is informed. Therefore, the control means 30 for the room B receives the communication signal transmitted from the control means 30 for the room A through the communication input ports $I_A$, $I_B$, and can recognize that the room A is being under the low temperature operation. The control means 30 for the room B controls a normal cooling operation for the room B regardless of the low temperature operation condition of the room A, as illustrated in FIG. 6, continuing to detect as to whether the room A is being under the low temperature operation condition.

Next, in case the second low temperature operation for the room B is detected at step S57, the detected result is coded into communication signal and then transmitted through communication output ports $O_A$, $O_B$ under the control of the control means 30 for the room B, such that the detection of a low temperature operation of the cooling operation for the room B is informed. Therefore, the control means 30 for the room A receives the communication signal transmitted from the control means 30 for the room B through the communication input ports $I_A$, $I_B$, and can recognize that the room B is being under the low temperature operation. The control means 30 for the room A controls a normal cooling operation for the room A regardless of the low temperature operation condition of the room B, as illustrated in FIG. 6, continuing to detect as to whether the room B is being under the low temperature operation condition.

In case the second low temperature for the room B is detected at step S57 (in case of YES), flow goes to S58 where both of the compressors 1 for the respective rooms A and B are Off. If not (in case of NO), flow goes to step S59 where only one compressor 1 for the room A is off, while the compressor 1 for the room B remains in a normal operation state. In case either of two compressors 1 for the rooms A, B is at the normal operation state, the outdoor fan 8 is reinitiated.

Meanwhile, in case the second low temperature operation for the room A is not detected (in case of NO) at step S56, flow goes to step S60 where it is determined whether the second low temperature operation for the room B is detected or not. If not (in case of NO), flow returns to step S56.

If the second low temperature operation for the room B at step S60 (in case of YES), flow goes to step S61 where only compressor 1 for the room B is off and the normal operation of the compressor 1 for the room A is maintained.

Namely, the control means 30 in the rooms A and B, respectively, transmit the coded communication signals containing the detection result of the low temperature operation through the communication output ports $O_A$, $O_B$ into the other control means 30, so that the detected results can be recognized, such that one indoor unit, regardless of the other unit, is operated to perform a normal cooling operation, as illustrated in FIG. 6.

Next, flow goes to step S62 where it is determined whether the respective indoor heat exchanger 4 for the rooms A and B return to their low recovery temperature. If not (in case NO), the process returns to step S62. However, in case of the low recovery temperature (in case of YES), the process returns to step S52.

At step S51, if it is determined that the condition is not the cooling operation (in case of NO), flow goes to step S70 in which the control means 30 performs a simultaneous heating operation for two rooms, like the heating operation for one room as described earlier.

Successively, at step S71, it is determined whether the conduit temperature of the indoor heat exchanger 4 for the room A is higher than a first high temperature Te. In case a first high temperature operation for the room A is not detected (in case of NO), the process proceeds to step S72 where the conduit temperature of the indoor heat exchanger 4 for the room B is higher than the first high temperature Te for the detecting of a fist high temperature operation for the room B.

In case of the first high temperature operation (in case of YES) for the room B, flow goes to step S73 where the control means 30 outputs a control signal to the outdoor fan motor driving means 80 to stop the outdoor fan 8.

At step S71, either in case of the first high temperature operation (in case of YES), or in case both rooms A and B is at the states of the first high temperature operation, flow also goes to step S73.

Next, at step S74, a second high temperature operation for the room A is detected based upon the result determined as to whether the conduit temperature of the indoor heat exchanger 4 for the room A is higher than the second high temperature Tf or not.

In case the second high temperature operation for the room A is detected at step S74, the detected result is coded into communication signal and then transmitted through communication output ports $O_A$, $O_B$ under the control of the control means 30 for the room A, such that the detection of a second high temperature operation of the heating operation is informed. Therefore, the control means 30 for the room B receives the communication signal transmitted from the control means 30 for the room A through the communication input ports $I_A$, $I_B$, and can recognize that the room A is being under the high temperature operation. The control means 30 for the room B controls a normal heating operation for the room B regardless of the high temperature operation condition of the room A, as illustrated in FIG. 6, continuing to detect as to whether the room A is being under the high temperature operation condition.

Next, at step S75, it is determined whether the conduit temperature of the indoor heat exchanger 4 for the room B is higher than a second high temperature Tf, or whether a second high temperature operation for the room B is detected. If so (in case of YES), the detected result is coded into communication signal and then transmitted through communication output ports $O_A$, $O_B$ under the control of the control means 30 for the room B, such that the detection of a high temperature operation of the heating operation is informed. Therefore, the control means 30 for the room A receives the communication signal transmitted from the control means 30 for the room B through the communication input ports $I_A$, $I_B$, and can recognize that the room B is being under the high temperature operation. The control means 30 for the room B controls a normal heating operation for the room B regardless of the high temperature operation condition of the room A, as illustrated in FIG. 7, continuing to detect as to whether the room B is being under the high temperature operation condition.

In case the second high temperature for the room B is detected at step S75 (in case of YES), flow goes to S76 where both of the compressors 1 for the respective rooms A and B are Off. If not (in case of NO), flow goes to step S77 where only one compressor 1 for the room A is off, while the compressor 1 for the room B remains in a normal operation state. In case either of two compressors 1 for the rooms A, B is at the normal operation state, the outdoor fan 8 is reinitiated.

Meanwhile, in case the second high temperature operation for the room A is not detected (in case of NO) at step S74, flow goes to step S75 where it is determined whether the second high temperature operation for the room B is detected or not. If not (in case of NO), flow returns to step S74.

If the second high temperature operation for the room B at step S78 (in case of YES), flow goes to step S79 where only compressor 1 for the room B is off and the normal operation of the compressor 1 for the room A is maintained.

Namely, the respective control means 30 in the rooms A and B, respectively, transmit the coded communication signals containing the detection result of the high temperature operation during the heating operation through the communication output ports $O_A$, $O_B$ into the other control means 30, so that the detected results can be recognized, such that one indoor unit, regardless of the other unit, is operated to perform a normal heating operation.

Next, flow goes to step S80 where it is determined whether the respective indoor heat exchanger 4 for the rooms A and B return to their high recovery temperature. If not (in case NO), the process returns to step S80. However, in case of the high recovery temperature (in case of YES), the process returns to step S70.

If it is determined that it is not the first high temperature operation for the room B (in case of NO), flow goes to step S90 in which it is determined whether the current condition corresponds to the defrost condition for the room A or not. If not (in case of NO), flow goes step S91 where it is determined whether the current condition corresponds to the defrost condition for the room B or not.

If it is determined that it is not the defrost condition for the room B (in case of NO), flow returns to step S70. However, in case of the defrost condition for the room B (in case of YES), the detected result corresponding to the defrosting during the heating operation is coded into communication signal and then transmitted through communication output ports $O_A$, $O_B$ under the control of the control means 30 for the room B. Therefore, the control means 30 for the room A receives the communication signal transmitted from the control means 30 for the room B through the communication input ports $I_A$, $I_B$, and can recognize that the room B is being under the defrosting operation. The control means 30 for the room A is operated to simultaneously perform the defrosting operation for the room A, as shown in FIG. 7, depending upon the defrosting operation of the room B Meanwhile, at step S90, if it is determined that it is the defrost condition for the room A (in case of YES), the detected result corresponding to the defrosting during the heating operation is coded into communication signal and then transmitted through communication output ports $O_A$, $O_B$ under the control of the control means 30 for the room A. Therefore, the control means 30 for the room B receives the communication signal transmitted from the control means 30 for the room A through the communication input ports $I_A$, $I_B$, and can recognize that the room A is being under the defrosting operation. The control means 30 for the room B is operated to simultaneously perform the defrosting operation for the room B, as shown in FIG. 7, depending upon the defrosting operation of the room A.

Next, at step S92, the control means 30 is operated to close the outdoor fan 8, and performs a normal operation of the compressor 1 for the defrosting operation. At step S93, it is determined whether the defrosting condition are released and completed or not. If not (in case of NO), steps subsequent to step S93 are repeated until the defrosting condition is released. If the defrosting is completed (in case of YES), flow returns to step S70.

As described above, the present invention providing a operation control apparatus for an air conditioner and method therefor advantageously provides communicating means between indoor units so as to know the current status of other indoor unit as desired, whereby one indoor unit can be normally operated even if the other indoor unit is being under the safety operation mode, this meeting consumer satisfaction for the product.

What is claimed is:

1. An air conditioner for simultaneously cooling a plurality of rooms or simultaneously heating a plurality of rooms by using a single outdoor unit and at least two indoor units connected to the outdoor unit, the air conditioner comprising:

indoor heat exchangers installed in respective rooms, for heat-exchanging a room air;

means for detecting varying temperatures of conduit during air conditioning;

control means for controlling low temperature, high temperature, and defrosting operations for respective indoor units on the basis of the detected conduit temperature, and for coding operation states of respective indoor units to input/output the coded communication signals;

communicating means for transmitting and receiving the coded communication signals through input/output ports provided with the control means for communicating between any indoor units;

means for driving compressors so as to control the low and high temperature operations in response to the control means; and means for driving an outdoor fan motor so as to control the low and high temperature operations and defrosting operation in response to the control means.

2. The air conditioner as claimed in claim 1, wherein the control means recognizes the respective operation states of indoor units with the communication between the indoor units through the communicating means, and maintains a normal operation of one indoor unit even if the other indoor unit is being under a safety operation mode.

3. The air conditioner as claimed in claim 1, wherein the control means normally perform a cooling operation of one indoor unit, even if the other indoor unit is operated to perform a low temperature operation, based upon the communication signal transmitted/received through the communicating means.

4. The air conditioner as claimed in claim 1, wherein the control means normally performs a heating operation of one indoor unit, even if the other indoor unit is operated to perform a high temperature operation, based upon the communication signal transmitted/received through the communicating means.

5. The air conditioner as claimed in claim 1, wherein the control means performs a defrosting operation of one indoor unit, when the other indoor unit performs a defrosting operation, based upon the communication signal transmitted/received through the communicating means.

6. The air conditioner as claimed in any one of claims 1 through 5, wherein the compressor is off during a second, low temperature operation and a second, high temperature operation.

7. The air conditioner as claimed in any one of claims 1 through 5, wherein the outdoor fan is off during a first, low temperature operation and a first, high temperature operation.

8. A method for controlling an air conditioner operation, the method comprising the steps of:

determining whether a current operation is two rooms operation or not;

performing simultaneous cooling of a plurality of rooms or simultaneous heating of the plurality of rooms, based upon the operation conditions determined by the determining step;

determining whether a safety operation mode for the air conditioner is applied or not, the safety operation mode corresponding to a low temperature operation, a high temperature operation and a defrosting operation in response to a conduit temperature of an indoor heat exchanger, wherein the conduit temperature varies during the air-conditioning operations; and driving compressors and an outdoor fan, based upon the determined one of the safety operation modes.

9. The method as defined in claim 8, wherein the step of determining the safety operation mode comprises determining whether the mode corresponds to the low temperature operation or not, based upon the detected conduit temperature of the indoor heat exchanger, the conduit temperature varying during the simultaneous cooling operation.

10. The method as defined in claim 8, wherein the step of determining the safety operation mode comprises determining whether the mode corresponds to the high temperature operation or not, based upon the detected conduit temperature of the indoor heat exchanger, the conduit temperature varying during the simultaneous heating operation.

* * * * *